United States Patent
Deraps et al.

(10) Patent No.: US 10,492,463 B2
(45) Date of Patent: Dec. 3, 2019

(54) KIT FOR MODULAR HOUSING FOR CATS

(71) Applicant: Be One Breed, Beloeil (CA)

(72) Inventors: Anthony Deraps, Beloeil (CA); Veronique Bibeau-Poissant, Boucherville (CA)

(73) Assignee: Be One Breed, Beloeil (CA)

( * ) Notice: Subject to any disclaimer, the term of this patent is extended or adjusted under 35 U.S.C. 154(b) by 337 days.

(21) Appl. No.: 15/606,460

(22) Filed: May 26, 2017

(65) Prior Publication Data

US 2017/0339916 A1 Nov. 30, 2017

Related U.S. Application Data

(60) Provisional application No. 62/342,050, filed on May 26, 2016.

(51) Int. Cl.
| | |
|---|---|
| *A01K 1/03* | (2006.01) |
| *A01K 1/035* | (2006.01) |
| *A01K 15/02* | (2006.01) |

(52) U.S. Cl.
CPC .............. *A01K 1/033* (2013.01); *A01K 1/035* (2013.01); *A01K 15/024* (2013.01); *A01K 15/027* (2013.01)

(58) Field of Classification Search
CPC ........... A01K 1/03; A01K 1/033; A01K 1/035
See application file for complete search history.

(56) References Cited

U.S. PATENT DOCUMENTS

| | | | | |
|---|---|---|---|---|
| 4,177,761 A | * | 12/1979 | Bellocchi, Jr. | A01K 1/035 119/482 |
| 4,807,808 A | * | 2/1989 | Reed | A01K 1/033 119/168 |
| 5,964,189 A | * | 10/1999 | Northrop | A01K 15/024 119/482 |
| 6,886,495 B1 | | 5/2005 | Madden et al. | |
| 7,584,720 B1 | * | 9/2009 | Jackson | A01K 1/033 119/452 |
| 2010/0089336 A1 | * | 4/2010 | Flannery | A01K 1/0245 119/498 |
| 2016/0338316 A1 | * | 11/2016 | Niedwick | A01K 1/033 |

FOREIGN PATENT DOCUMENTS

| | | | | |
|---|---|---|---|---|
| CA | 1158490 A | * | 12/1983 | A01K 1/033 |
| DE | 2945449 A1 | * | 6/1981 | A01K 1/033 |
| WO | WO-2013049893 A1 | * | 4/2013 | A01K 1/0254 |

* cited by examiner

*Primary Examiner* — Monica L Williams
*Assistant Examiner* — Aaron M Rodziwicz
(74) *Attorney, Agent, or Firm* — Benoit & Cote Inc.; C. Marc Benoit

(57) ABSTRACT

A kit for building a module for a pet comprises two bases and at least three wall panels. Each base comprises a base body extending along a first plane, a base contour wall extending substantially perpendicular to the first plane along its contour and a base secondary wall extending substantially parallel to the base contour wall thereby defining an anchoring space therebetween. Each wall panel comprises a panel body and a panel secondary wall substantially parallel to the panel body for insertion into the anchoring space between the base secondary wall and the base contour wall.

19 Claims, 16 Drawing Sheets

KIT FOR MODULAR HOUSING FOR CATS

CROSS-REFERENCE TO RELATED APPLICATION

This application claims priority from U.S. patent provisional application 62/342,050 filed May 26, 2016, the specification of which is hereby incorporated herein by reference in its entirety.

BACKGROUND (a) Field

The subject matter disclosed generally relates to pet accessories. More specifically, it relates to modular housing for pets.

(b) Related Prior Art

Various types of accessories are designed to house or entertain pets such as cats. Among these accessories, there exist housings for cats to enjoy a plurality of enclosures in which other accessories such as toys can be installed.

These housing are often pre-mounted when they are manufactured, which requires space in a pet store and care from their employees.

Otherwise, housing modules may be mountable, as described in U.S. Pat. No. 6,886,495. The walls of the modules are pre-assembled together; rods are inserted into these pre-assembled walls to erect the structure and provide rigidity to the erected walls.

SUMMARY

One general aspect includes a kit for building a module for a pet, the kit including: —two bases, each base including a base body extending along a first plane, a base contour wall extending substantially perpendicularly to the first plane along a contour of the base body and a base secondary wall extending substantially parallel to the base contour wall thereby defining an anchoring space between the base contour wall and the base secondary wall; and —wall panels, each wall panel including a panel body and a panel secondary wall substantially parallel to the panel body, where the panel secondary wall is for insertion into the anchoring space to thereby releasably hold the panel secondary wall into the anchoring space.

Implementations may include one or more of the following features. The kit where each base further includes a protrusion biased toward the anchoring space and each wall panel includes an abutting surface, where the protrusion releasably locks the wall panel in place by cooperating with the abutting surface upon insertion of any one of the wall panels in the anchoring space. The kit where the panel secondary wall includes an opening and where the opening provides the abutting surface. The kit where the base secondary wall has a height relative to the first plane and where the protrusion extends perpendicular to the first plane above the height of the base secondary wall. The kit where each base further includes inserts joining the base contour wall and the base secondary wall, and each wall panel include slots, where the inserts enter in the slots upon inserting each wall panel in the anchoring space. The kit where each wall panel includes edges, the kit further including rods having a shape that is complementary to the edges, where the rods are for cooperating with the edges of adjacent wall panels thereby joining the adjacent wall panels. The kit where each base further includes an aperture and the kit further includes a fastener, where two contacting modules are joined together by passing the fastener through the apertures of the two contacting modules. The kit where the base contour wall extends perpendicularly to the first plane above the base secondary wall. The kit where each base and each wall panel is made of a single molded piece. The kit where the wall panels are interchangeable with each other, thereby allowing customization of the module. The kit where each wall panel further includes an opening providing the abutting surface. The kit where each base further includes inserts joining the base contour wall and the base secondary wall, and each wall panel include slots, where the inserts enter in the slots upon inserting of each wall panel in the anchoring space. The kit where each wall panel includes edges, the kit further including rods having a shape that is complementary to the edges, where the rods are for cooperating with the edges of adjacent wall panels thereby joining the adjacent wall panels. The kit where each base further includes an aperture and the kit further includes a fastener, where two contacting modules are joined together by passing the fastener through the apertures of the two contacting modules. The kit where the base secondary wall has a height relative to the first plane and where the protrusion extends perpendicularly to the first plane above the height of the base secondary wall. The kit where each base and each wall panel is made of a single molded piece. The method where the wall panels include a contour including two anchoring components and edges, the method further including: —providing a rod having a complementary shape to the edges of two adjacently mounted wall panels, and —clamping the rod to the edges of the two adjacently mounted wall panels. The method where the built module is a primary module, the method further including: —building an additional module for a pet, —selecting a primary contact base among the two bases of the primary module and a secondary contact base among the two bases of the additional module, —placing the primary contacting base in contact with a secondary contacting base with an aperture in the primary contacting base aligned with an aperture in the secondary contacting base, and —inserting a fastener through the apertures thereby fastening the primary module to the additional module.

One general aspect includes a kit for building a module for a pet, the kit including: —two bases, each base including: —a base body extending along a first plane; —a base contour wall extending substantially perpendicularly to the first plane along a perimeter of the base body; —a base secondary wall extending substantially parallel to the base contour wall thereby defining an anchoring space between the base contour wall and the base secondary wall; and —a protrusion biased toward the anchoring space; and —at least three wall panels, each wall panel including: The kit also includes —a panel body and an abutting surface. The kit also includes —a panel secondary wall substantially parallel to the panel body. The kit also includes where the panel secondary wall is for insertion into the anchoring space, and where, upon insertion, the protrusion releasably locks the wall panel in place by cooperating with the abutting surface of the inserted panel secondary wall.

Implementations may include one or more of the following features. The kit where each wall panel further includes an opening providing the abutting surface. The kit where each base further includes inserts joining the base contour wall and the base secondary wall, and each wall panel include slots, where the inserts enter in the slots upon inserting of each wall panel in the anchoring space. The kit where each wall panel includes edges, the kit further including rods having a shape that is complementary to the edges, where the rods are for cooperating with the edges of adjacent wall panels thereby joining the adjacent wall panels. The kit where each base further includes an aperture and the kit further includes a fastener, where two contacting modules are joined together by passing the fastener through the apertures of the two contacting modules. The kit where the base secondary wall has a height relative to the first plane and where the protrusion extends perpendicularly to the first plane above the height of the base secondary wall. The kit where each base and each wall panel is made of a single molded piece. The method where the wall panels include a contour including two anchoring components and edges, the method further including: —providing a rod having a complementary shape to the edges of two adjacently mounted wall panels, and —clamping the rod to the edges of the two adjacently mounted wall panels. The method where the built module is a primary module, the method further including: —building an additional module for a pet, —selecting a primary contact base among the two bases of the primary module and a secondary contact base among the two bases of the additional module, —placing the primary contacting base in contact with a secondary contacting base with an aperture in the primary contacting base aligned with an aperture in the secondary contacting base, and —inserting a fastener through the apertures thereby fastening the primary module to the additional module.

One general aspect includes a method for building a module for a pet, the method including the steps of: —providing two bases and at least three wall panels, one of the two bases and the wall panels including a female anchoring component and the other of the two bases and the wall panels including a male anchoring component complementary to the female anchoring component; —mounting wall panels to a first one of the bases by, for each one of the wall panels, inserting the male anchoring component in the female anchoring component thereby defining a junction therebetween; and —mounting the second one of the bases to the wall panels by inserting, for each one of the wall panels, the male anchoring component in the female anchoring component thereby defining a junction therebetween.

Implementations may include one or more of the following features. The method where the wall panels include a contour including two anchoring components and edges, the method further including: —providing a rod having a complementary shape to the edges of two adjacently mounted wall panels, and —clamping the rod to the edges of the two adjacently mounted wall panels. The method where the built module is a primary module, the method further including: —building an additional module for a pet, —selecting a primary contact base among the two bases of the primary module and a secondary contact base among the two bases of the additional module, —placing the primary contacting base in contact with a secondary contacting base with an aperture in the primary contacting base aligned with an aperture in the secondary contacting base, and —inserting a fastener through the apertures thereby fastening the primary module to the additional module.

According to an aspect of the invention, there is provided a kit for a module for housing a cat, the kit comprising: two bases, each base comprising a base body extending along a substantially horizontal plane, a base contour wall extending substantially vertically along a perimeter of the base body and a base secondary wall extending substantially parallel to the base contour wall thereby defining a spacing; at least three walls, each wall comprising a body defining a face of the module, each wall comprising a secondary wall substantially parallel to the wall body for insertion into the spacing between the base secondary wall and the base contour wall;

and rods, each rod being for securing adjacent ones of the walls at an inner corner defined between the adjacent ones of the walls.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

There is described herein a kit for building a module for a pet, and according to embodiment a modular housing for cats that can be stored efficiently and that can be mounted easily, and that allows customization of each wall panel of a module. This customizability is more adapted to the reality of cats, which are notoriously capricious or stubborn, and may strongly prefer one configuration over another one. The customizability is further useful when mounting assemblies of modules, where the fact of having custom modules at specific locations in the assembly may yield a better overall result, e.g., placing a scratching pad only on an elevated module, placing a cushion at the top of the assembly, and the like.

Figure 1:
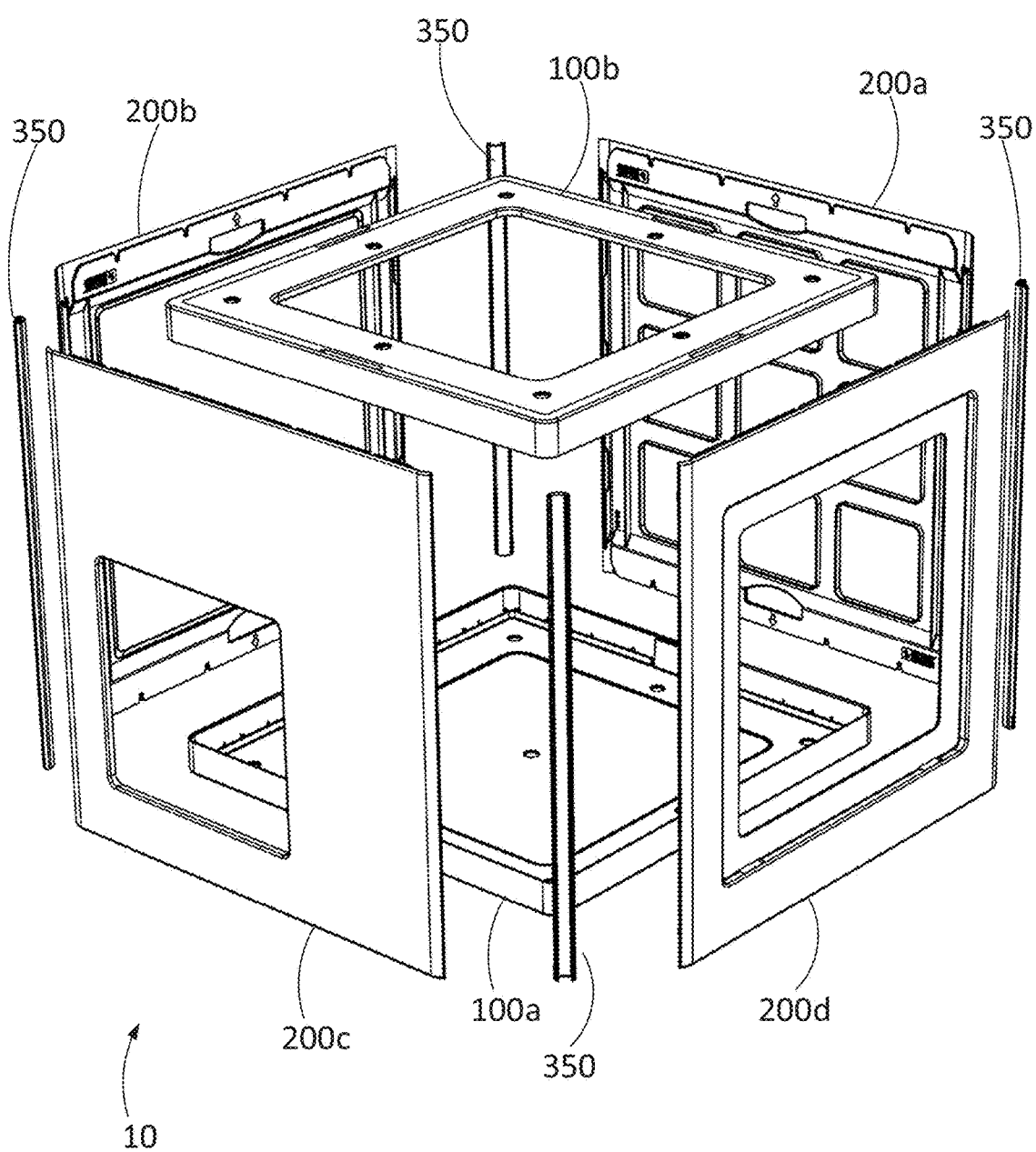
FIG. 1 is an exploded view illustrating a housing module for cats, according to an embodiment.
Figure 2:
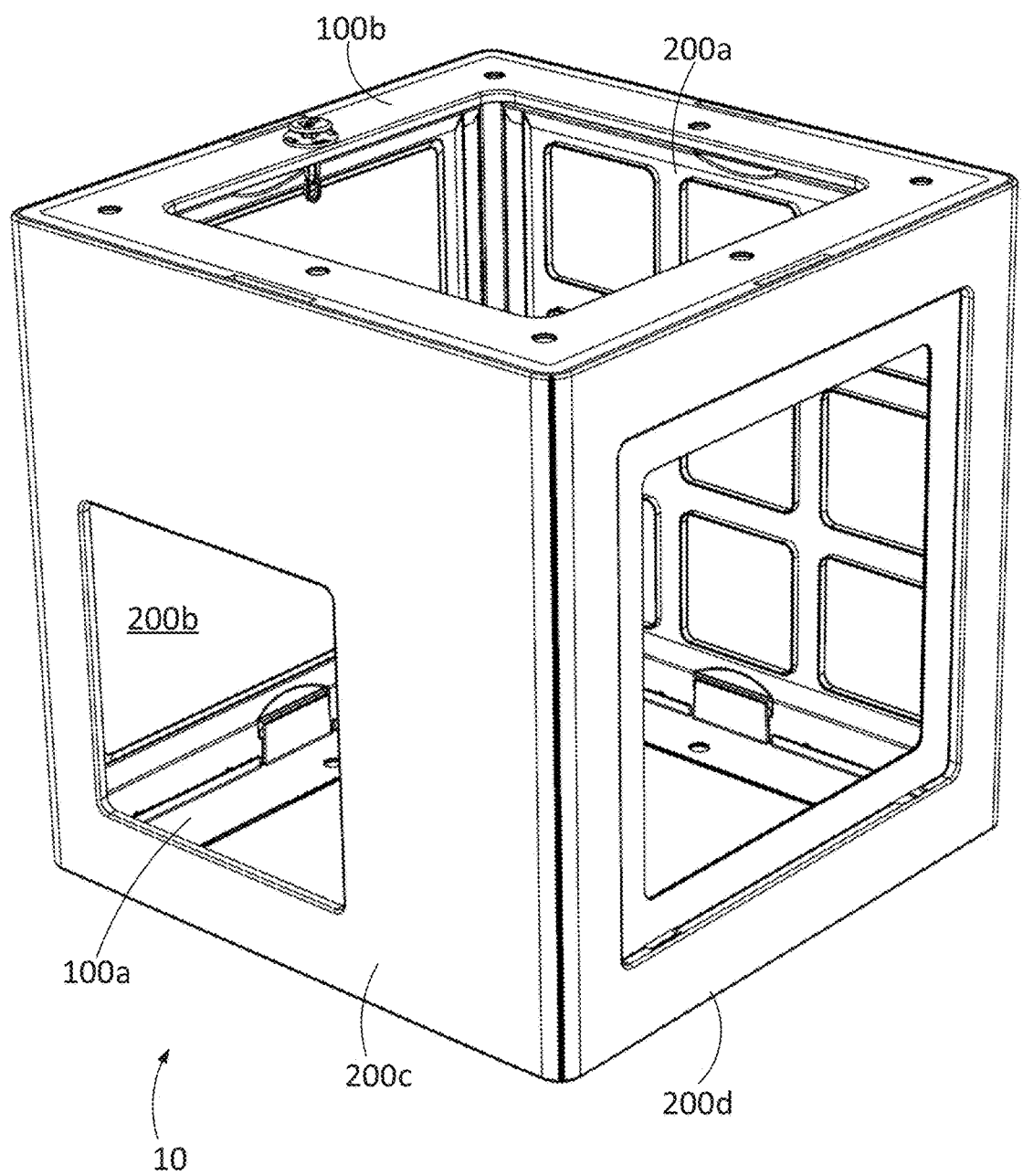
FIG. 2 is a perspective view of the housing module for cats of FIG. 1.
Figure 3A:
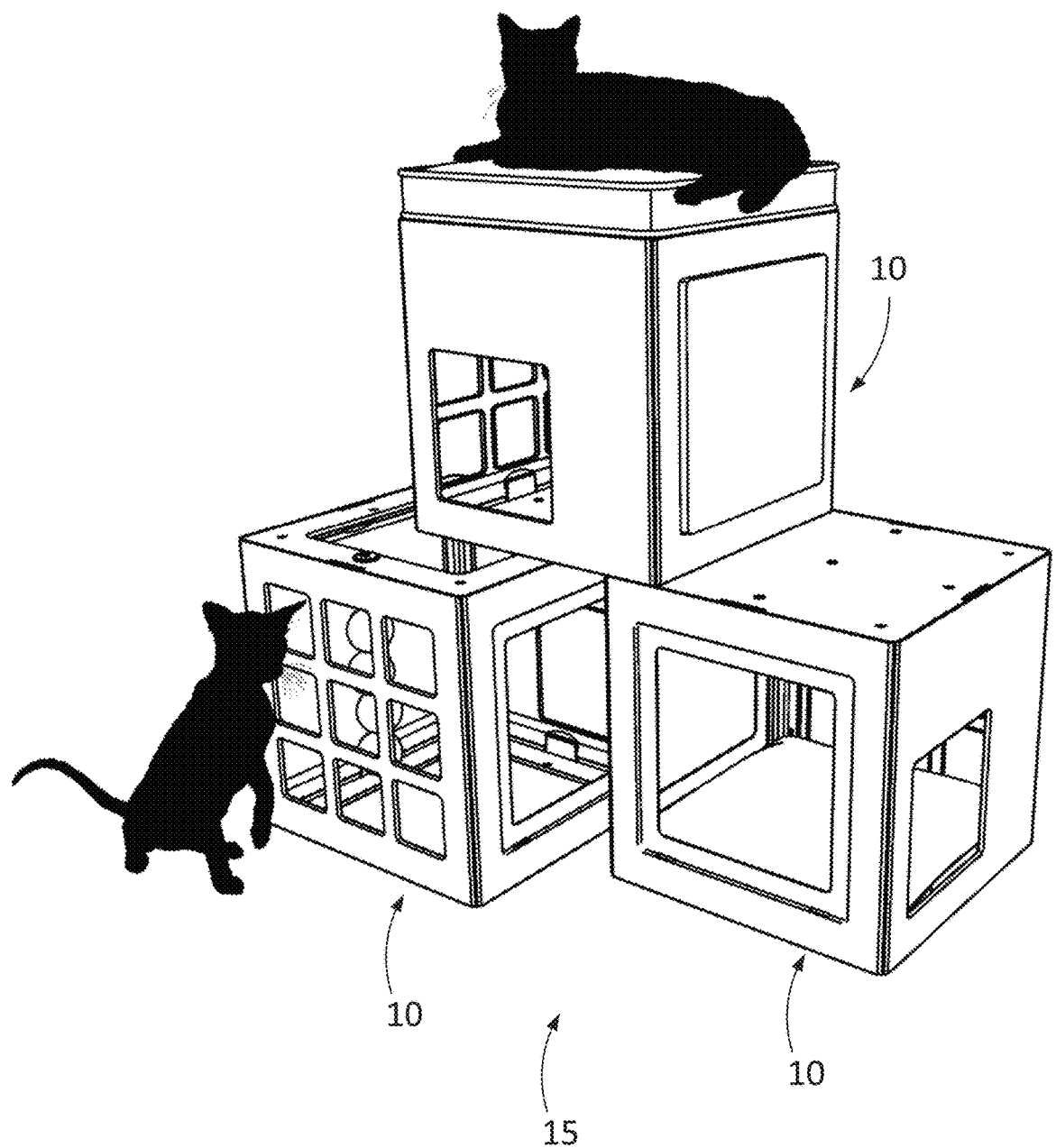
FIGS. 3A-3D are perspective views and a front view illustrating the assemblies of housing modules for cats, according to various embodiments.
Figure 3B:
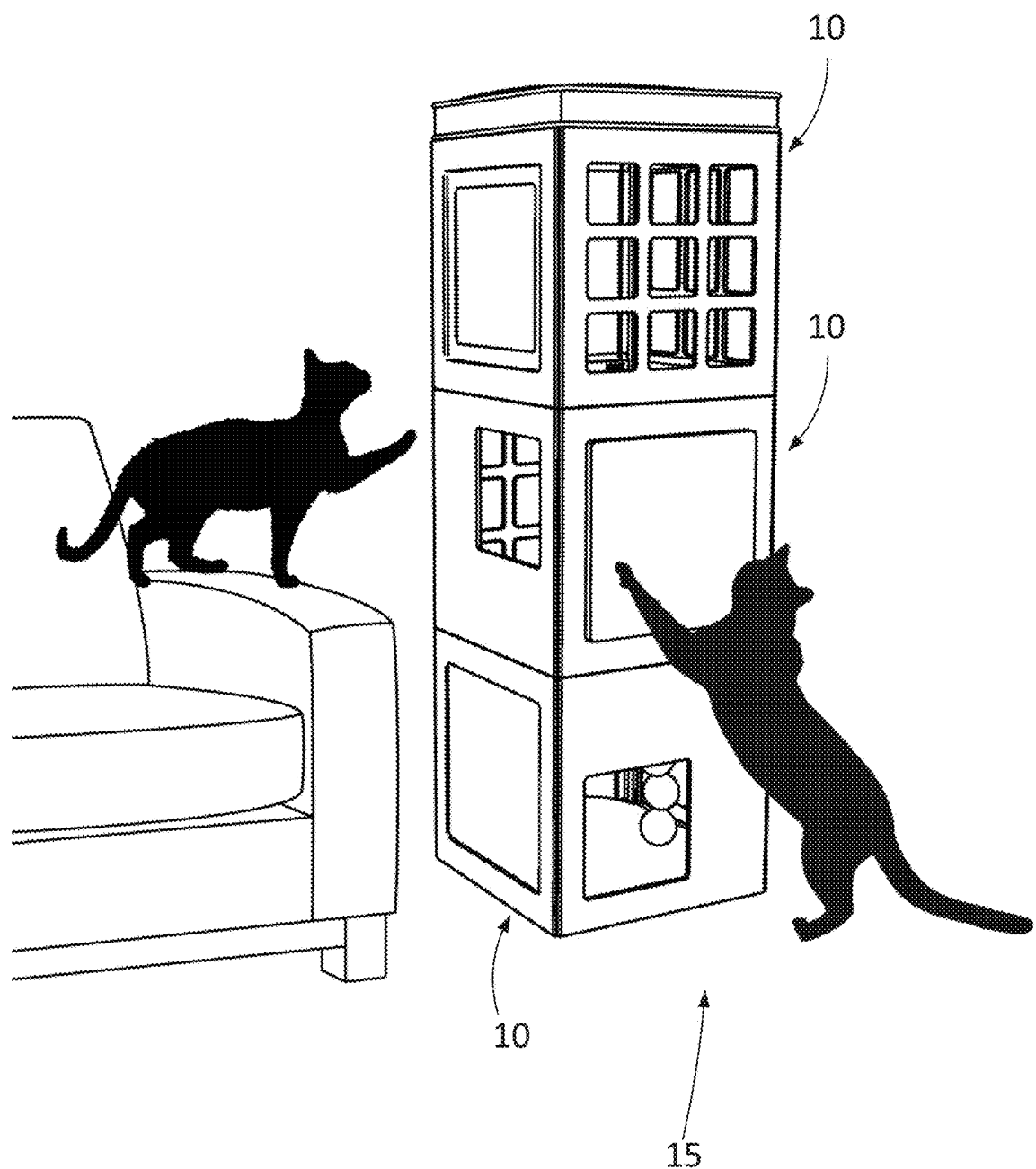
Figure 3C:
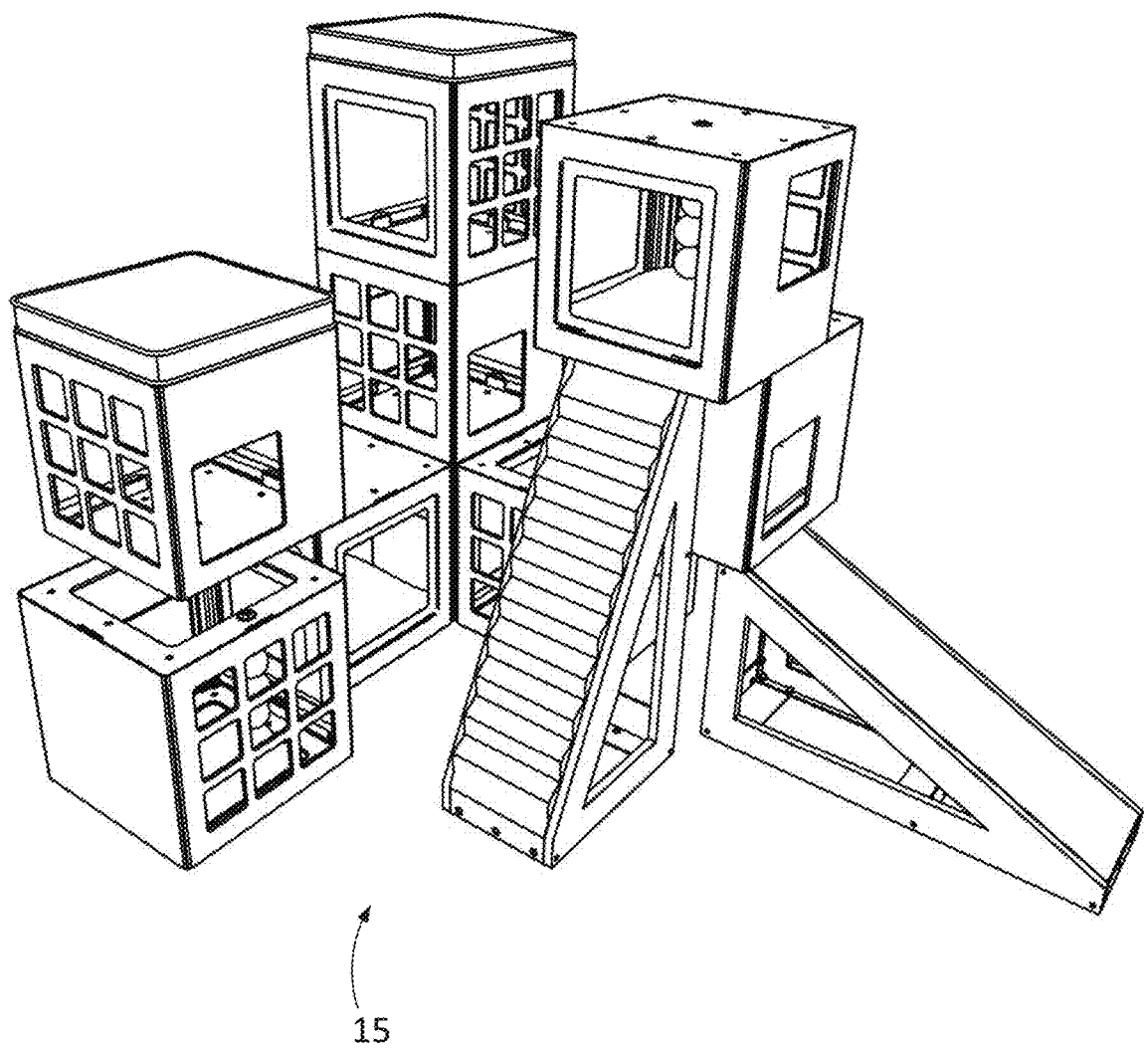
Figure 3D:
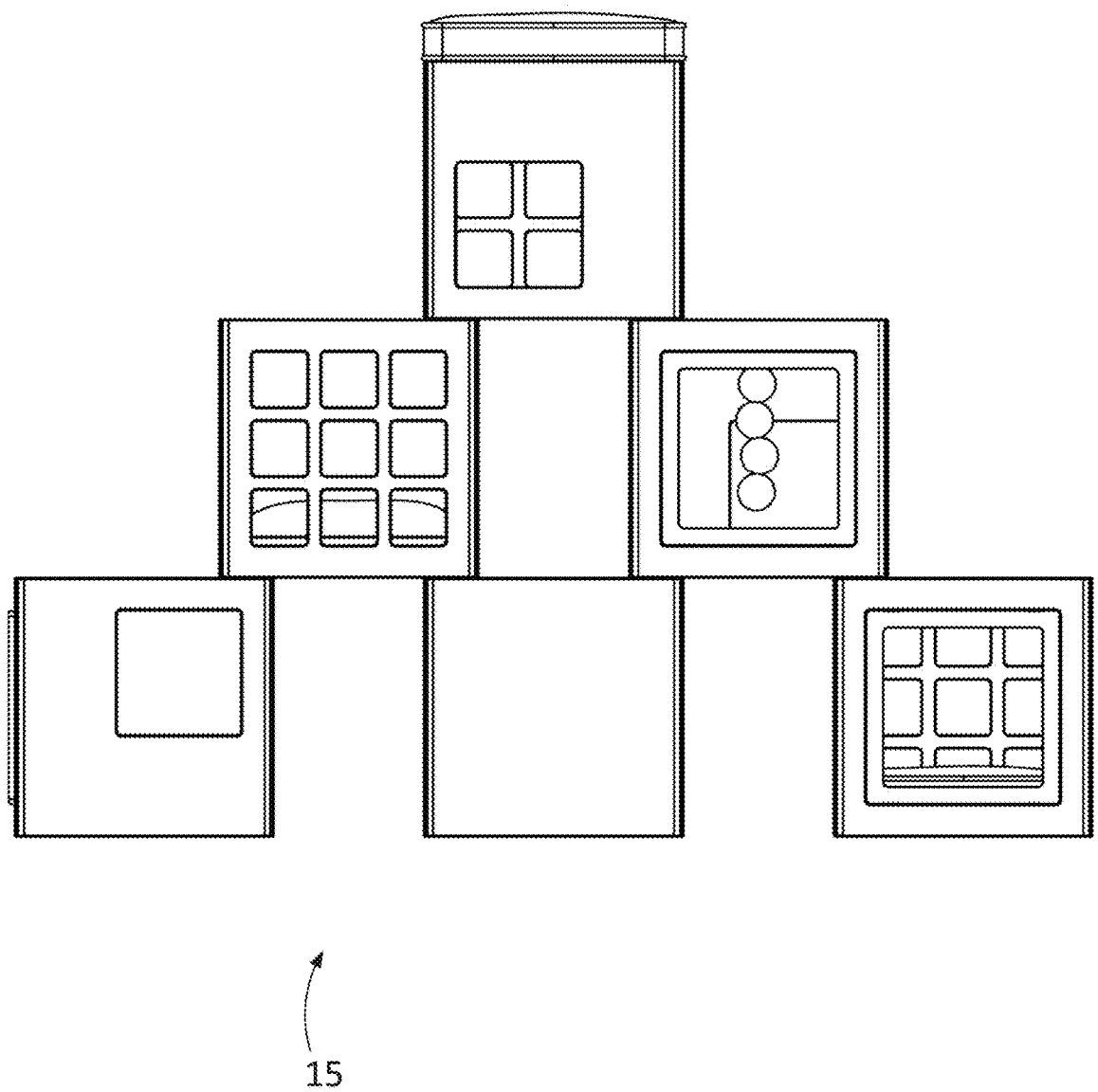

FIG. 1 is an exploded view of a module 10. Each module 10 comprises bases 100 and walls 200 which are held together using rods 350 which connect opposing bases 100 along the edges of the walls 200. FIG. 2 shows an assembled module 10.

FIGS. 3A-3D show various embodiments of an assembly 15 made up of a plurality of modules 10. The modules 10 can be assembled as towers, pyramids and the like. The modules 10 are normally mounted with fasteners 310 for solidity. The assemblies 15 shown in these figures illustrate various configurations that are usually appreciated by cats. For instance, the outer cushion is more often appreciated by the cat when it is installed on the uppermost part of the assembly. Scratching pads are more usually appreciated when mounted on a module 10 which is not on the ground. Customizability allows such configurations to be made efficiently.

Figure 4A:
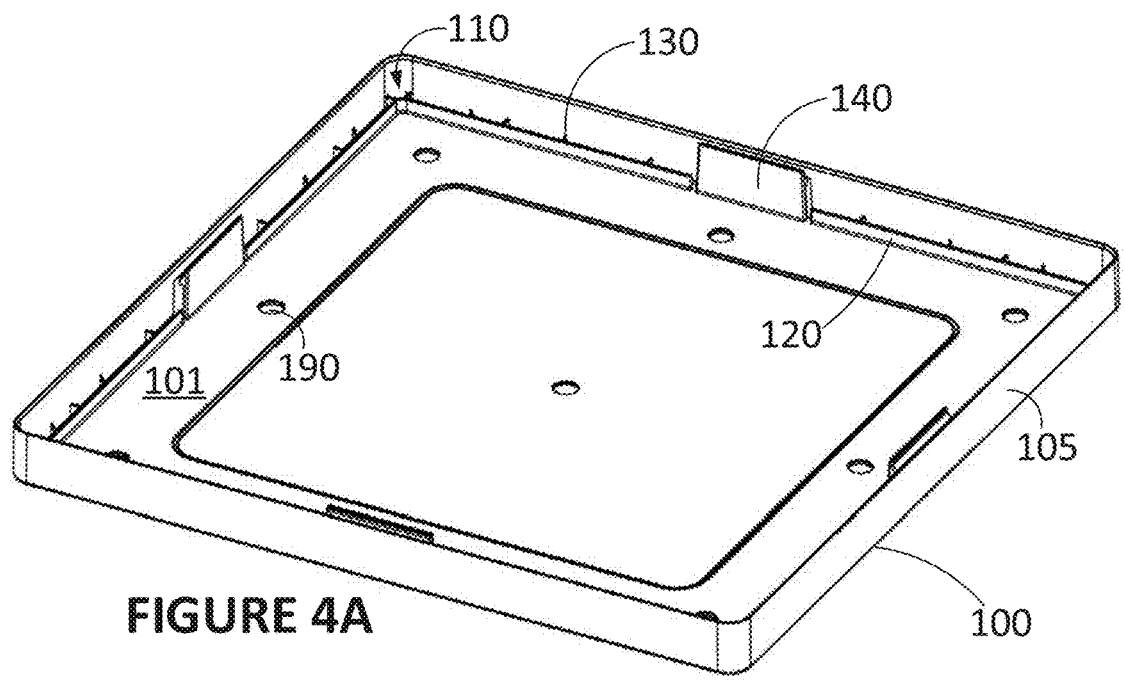
FIGS. 4A-4B are perspective views of a base of a housing module for cats, according to an embodiment.
Figure 4B:
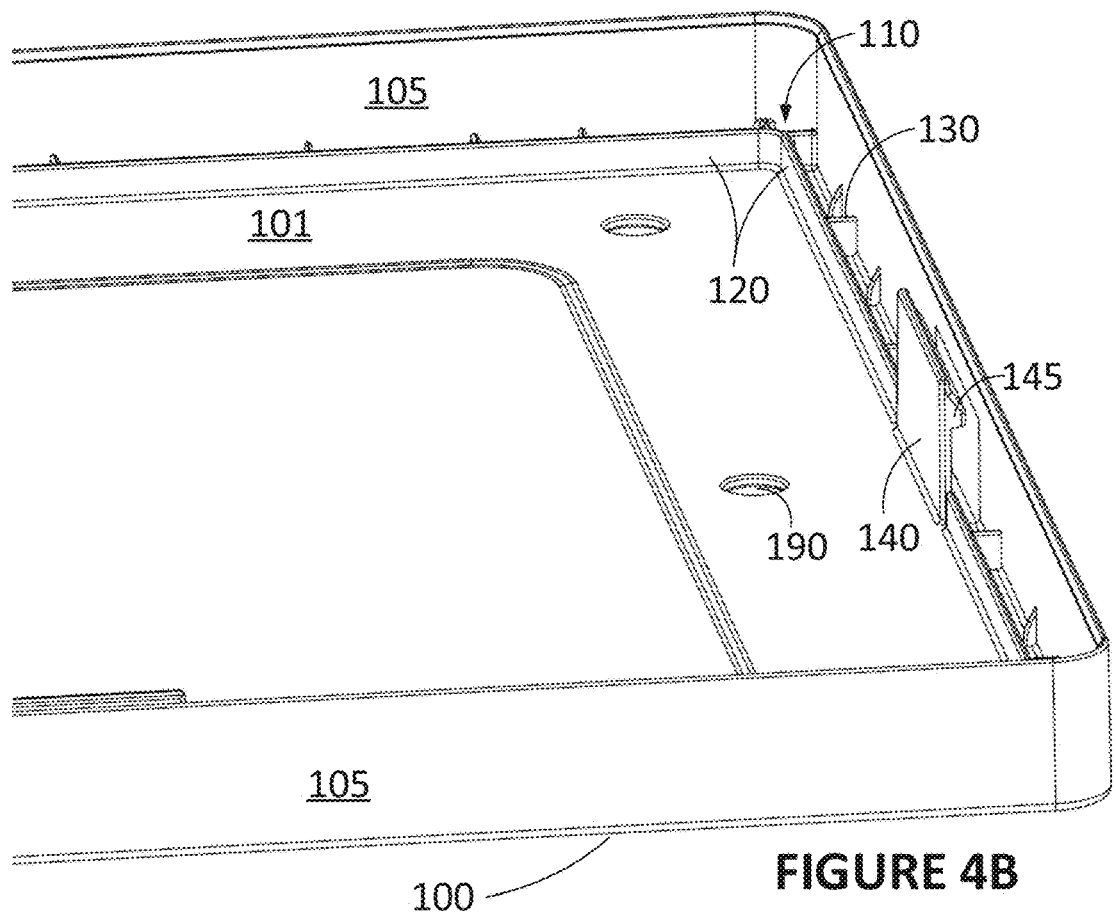

FIGS. 4A-4B illustrate a base 100. The base 100 comprises a body 101 which forms most of the surface of the base 100. The body 101 extends along a horizontal plane. The body 101 may be made without or with an opening, thereby forming a plain base 100a or an opened base 100b, respectively, as shown in FIGS. 1-2.

While the body 101 of the base 100 extends along a horizontal plane, the contours of the body 101 are provided with a base contour wall 105 which extends substantially perpendicularly (i.e., vertically) with respect to the plane of the body 101, as shown in FIG. 4A-4B.

According to an embodiment, the base contour wall 105 is provided along the whole perimeter of the body 101 of the base 100. In other embodiments, not shown, some portions of the perimeter may be free of such a base contour wall 105, which would thus be intermittent. The body 101 may also extend outwardly, meaning that the base contour wall 105 would not be located exactly on the perimeter but rather slightly within the base 100.

Since the body 101 of the base 100 has a substantially rectangular shape (including a substantially square shape as shown), the base contour wall 105 comprises corners (usually there are four of these corners). These corners provide a location where the end of a rod 350 may be fitted, i.e., they define a rod-fitting end 110 as shown in FIGS. 4A-4B. Two of the base contour walls 105, together with two of the base secondary walls 120 (described below), create a small cornered space where the end of the rod 350 may be fitted, either firmly or loosely depending on the width of the rod-fitting end 110 with respect to the rod 350 itself. Even though the modules 10 are shown as comprising four wall panels 200, a module 10 could alternatively be produced with only three wall panels 200, as long as the base 100 covers their top for structural integrity of the module 10. In this case, there exist only two corners formed by adjacent wall panels 200, and therefore there are provided only two rods 350.

According to an embodiment, the end surface of the rod 350 abuts on the body 101 in the bottom of the rod-fitting end 110. In an embodiment, the rod 350 can be shorter than the height of a wall panel 200 and therefore not abut on both bases 100, or not abut on any base 100. This is because the rod 350 is used to secure adjacent wall panels 200 if substantial weight is applied from the top or if the cat inside the module 10 presses on the edges of the wall panels 200 from within the module 10. Having the rod 350 abut on one or two bases 100 is not necessary in retaining the edges of adjacent wall panels 200 together, therefore the rod 350 may be shorter than the height and provided closer to the center of the edges.

As mentioned above, a base secondary wall 120 is provided with approximately the same shape as the base contour wall 105, but smaller in size and inwardly located from the contour of the body 101, as shown in FIGS. 4A-4B.

There is thereby defined an anchoring space between the base contour wall 105 and the secondary wall 120. Tops or bottoms of wall panels 200 are inserted in this anchoring space. There are provided flat protrusions extending vertically from the base 100 inside the anchoring space, substantially perpendicularly from the closest part of the base contour wall 105, to prevent the base contour wall 105 and the base secondary wall 120 top move laterally relatively to each other. These flat protrusions are secondary wall inserts 130 which are provided to interlock with corresponding slots 230 of the wall panel 200 that is inserted therein. The secondary wall inserts 130 are for rendering the insertion of the wall panel 200 more stable in the anchoring space and preventing horizontal movement of the wall panel 200 within the anchoring space.

Vertical protrusions 140 extend vertically and substantially perpendicularly from the base 100. According to an embodiment, the vertical protrusions 140 are portions of the secondary walls 120, e.g., in FIGS. 4A-4B the vertical protrusions 140 are at the center of the secondary walls 120 which extend further vertically at this location. As shown in FIG. 4B, the vertical protrusion 140 further include another protrusion 145 which does not need to be flat but extends at least horizontally and away from the vertical plane along which the vertical protrusion 140 extends. This protrusion 145 are biased toward the anchoring space. This protrusion 145 is intended to eventually cooperate with an opening 240 in the wall panel 200 that is inserted on the base 100 (or on which a base 100 is inserted) to secure the wall panel 200 to the base 100 by a releasably locking connection.

The base 100 is pierced with apertures 190 for inserting fasteners 310 therethrough. The fasteners 310 are described further below.

Figure 5A:
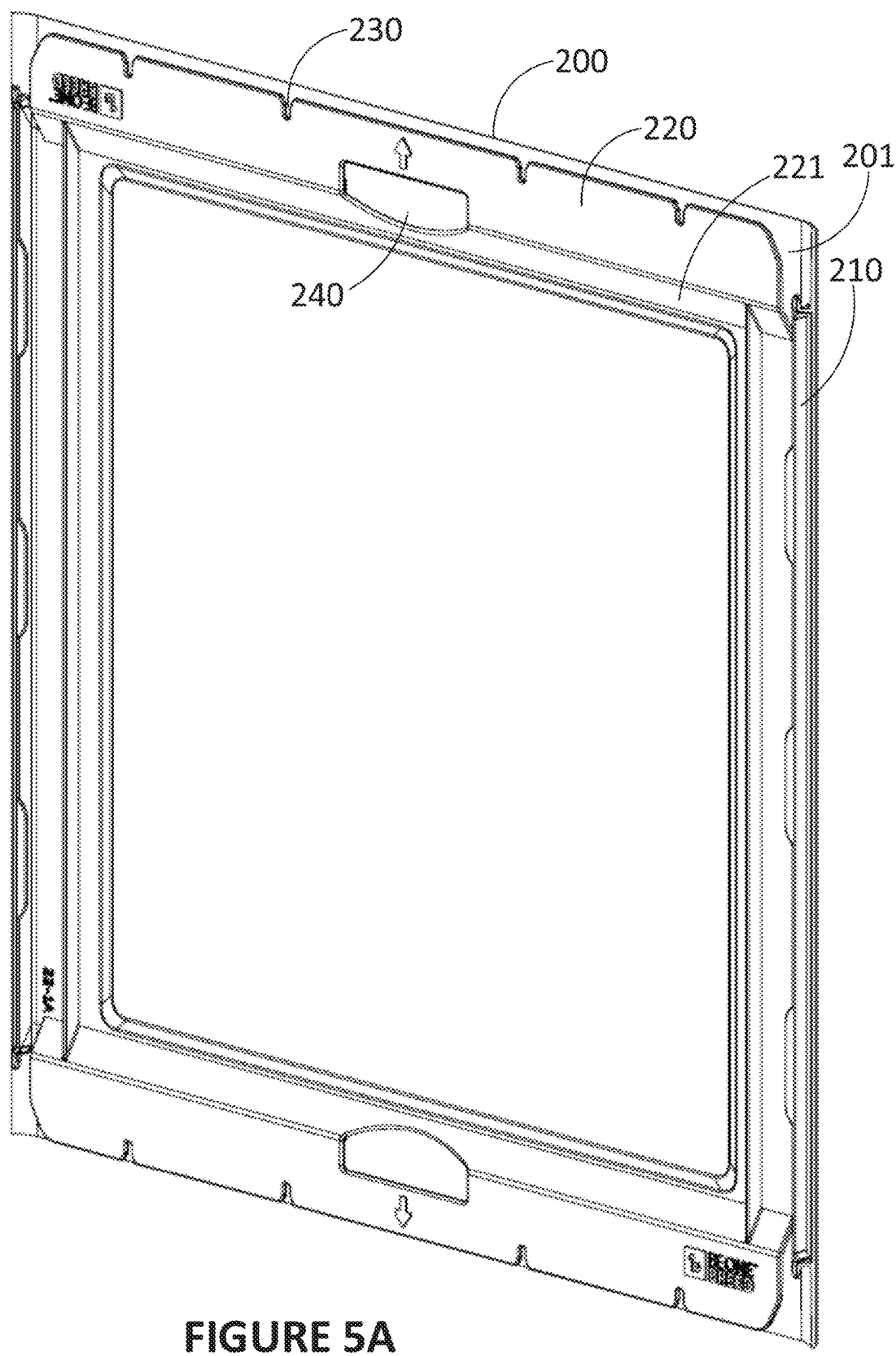
FIGS. 5A-5B are perspective views of a wall of a housing module for cats, according to an embodiment.
Figure 5B:
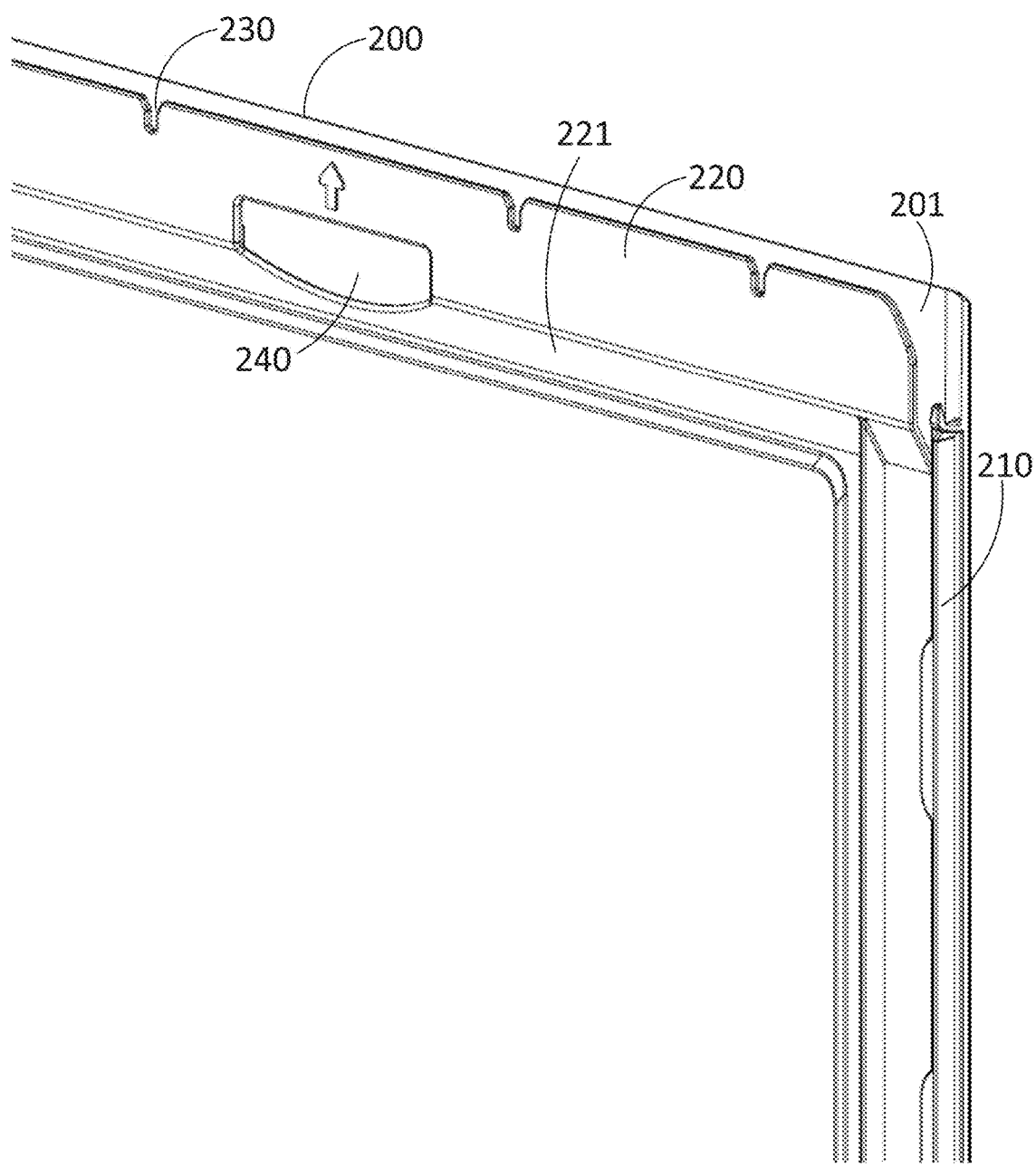

Now referring to FIGS. 5A-5B, there is illustrated a wall panel 200. As shown in other figures, the wall panel 200 can comprise a windowed wall panel 200a, a plain wall panel 200b, an opened wall panel 200c, or a mounting wall panel 200d. Other types of wall panels 200, not shown, can be contemplated. Each one of these types of wall panels 200 are of substantially the same size.

The wall panel 200 comprises a wall body 201 which forms most of the surface of the wall panel 200 extending along a substantially vertical plane. The wall body 201 can comprise an opening or a plurality of openings depending on the type of wall panel 200. Unlike the base 100, the wall panel 200 does not comprise perpendicularly-extending walls, which implies that most of the shape of the wall panel 200 is determined by the shape of the base 100. This is because the wall panel 200 is for insertion into a base 100. Its substantially flat shape permits to the wall panel 200 to be inserted in the anchoring space; the wall panel consequently comprising in a male anchoring component while the anchoring space defining the complementary female anchoring component.

The wall comprises a rod-mounting edge 210 on each side of the wall panel 200. The rod-mounting edge 210 is intended to be clamped by the rod 350. More precisely, the rod-mounting edge 210 of one wall panel 200 should joined therethrough with the rod-mounting edge 210 of an adjacent wall panel 200. Indeed, adjacent wall panels 200, when in place, form a corner at which their respective rod-mounting edges 210 meet and form a shape that can be clamped by the rod 350. The rod 350 should have a shape to cooperate with the union of adjacent rod-mounting edges 210, i.e., their shape should be complementary so that the adjacent rod-mounting edges 210 fit in the rod 350. Therefore, the rod 350 should be hollow along its length so that the rod 350 can be secured over the adjacent rod-mounting edges 210 which thus fill in the hollow.

The wall panel 200 comprises a panel secondary wall 220 which extends also vertically but in another plane parallel to the plane of the wall body 201. The panel secondary wall 220 is the portion of the wall panel 200 that is inserted in the anchoring space between the base contour wall 105 and the base secondary wall 120 of the base 100. The panel secondary wall 220 comprises base-fitting slots 230 that cooperate with corresponding ones of the secondary wall inserts 130 of the base 100 in which the wall panel 200 is inserted. Since the panel secondary wall 220 extends in another parallel plane offset with the plane of the wall body 201, the panel secondary wall 220 comprises a sloped portion 221 to provide this offset. An opening 240, and more specifically an abutting surface at the bottom of the opening 240, is provided in the panel secondary wall 220. This opening 240 is intended to cooperate with the vertical protrusion 140 (including its protrusion 145) that fits therein. If the user pushes on the protrusion 145, the vertical protrusion 140 is brought backward so that the vertical protrusion 140 does not cooperate anymore with the opening 240 and the wall panel 200 can then be removed, as shown in FIG. 9B, described further below.

Figure 6:
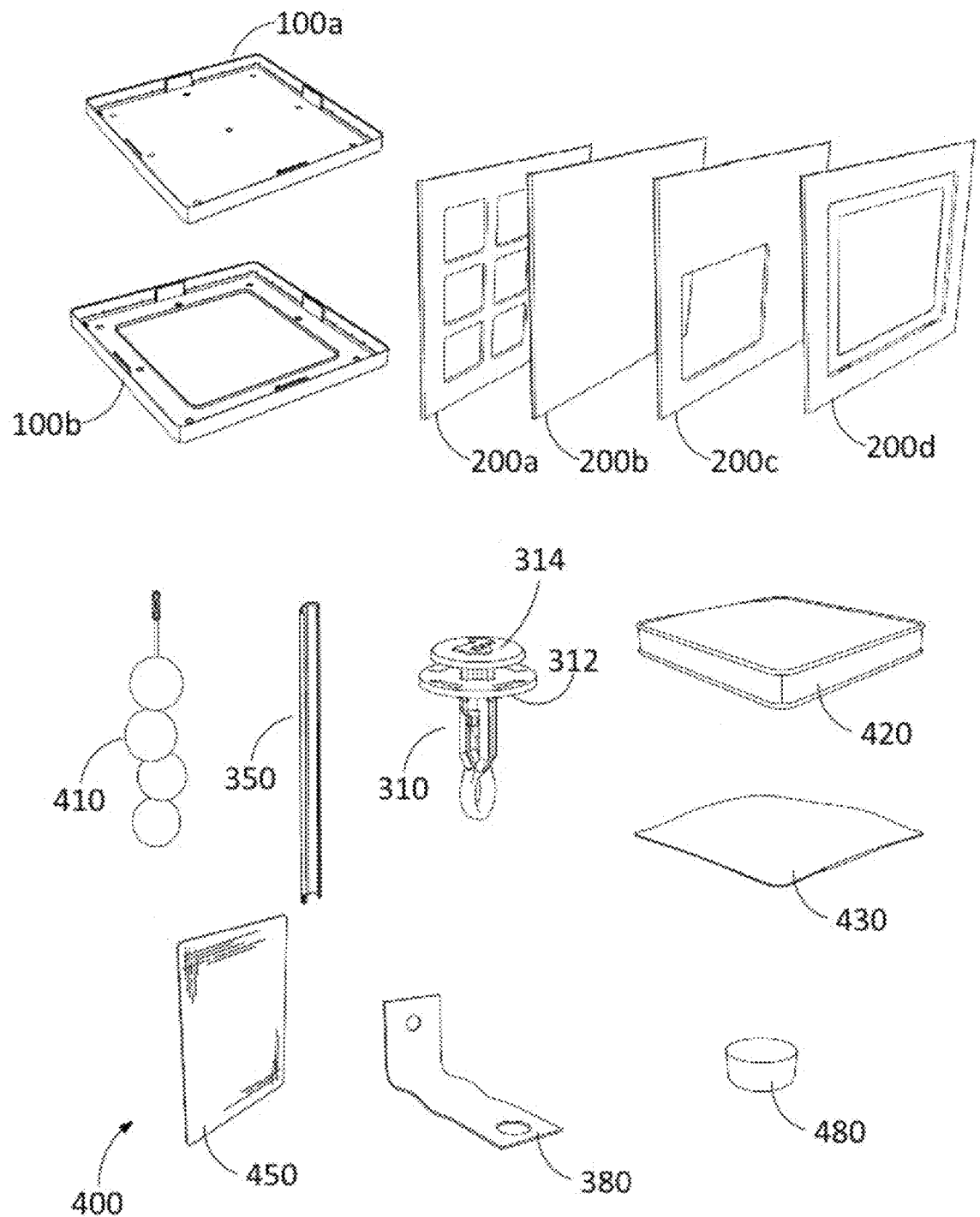
FIG. 6 is a perspective view of a kit for mounting a housing module, according to an embodiment.

Now referring to FIG. 6, there is shown a kit for mounting modules 10 including accessories 400 (the number of items represents exemplary numbers for a kit of three modules 10).

The accessories 400 include, without limitation: a hanging object 410, an outer cushion 420 to be mounted on or in a module 10, an inner cushion 430 to be installed inside a module 10, a scratching pad 450 to be mounted on a mounting wall panel 200d, feet 480, and the like. According to an embodiment, the inner cushion 430 and the outer cushion 420 is the same cushion that can be used at any location.

Other tools such as fasteners 310, rods 350 and wall fasteners 380 are also illustrated in FIG. 6. These elements are used for mechanical connectivity of parts of modules 10 or between modules 10.

Figure 7A:
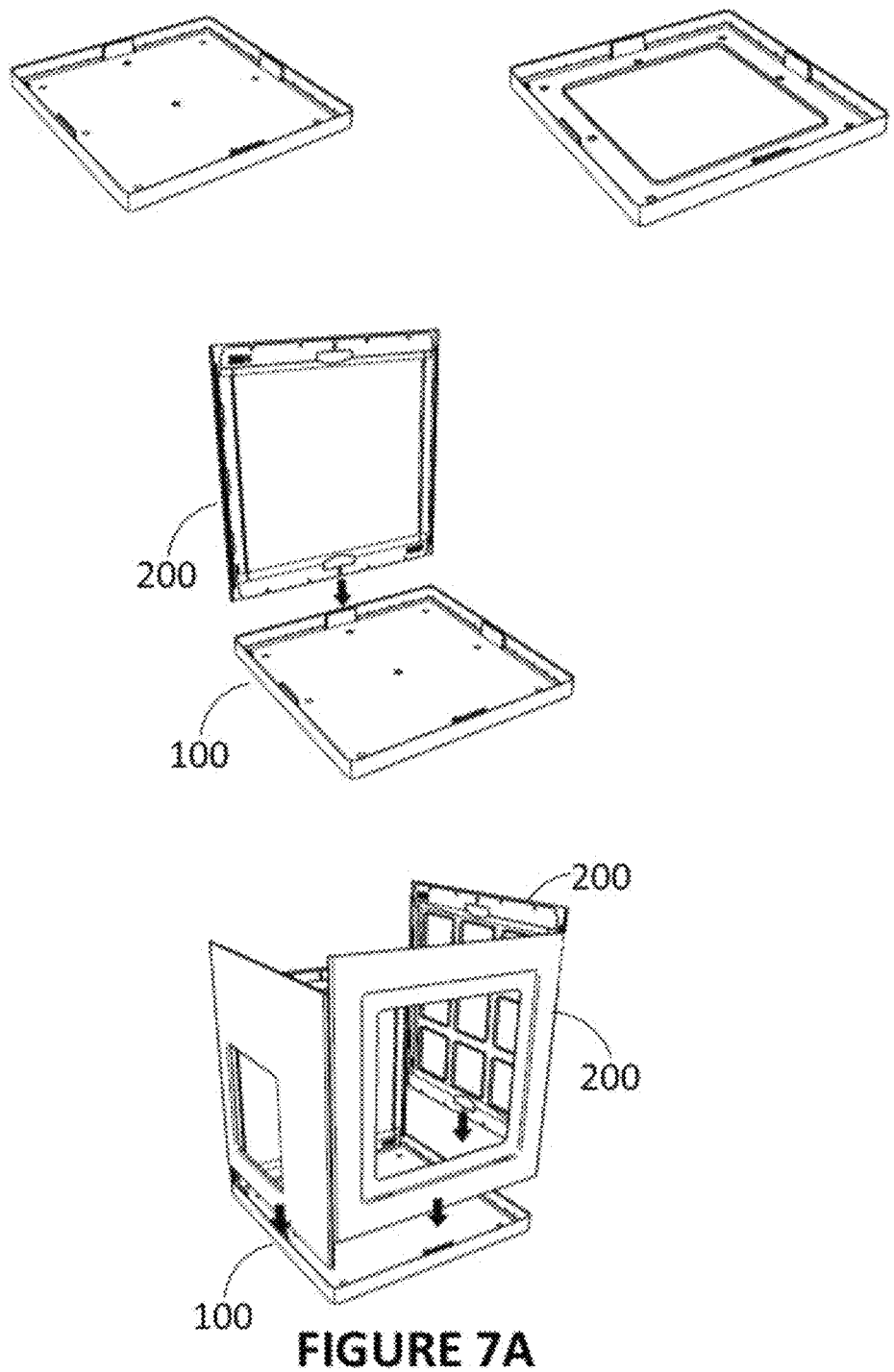
FIGS. 7A-7B are perspective views of a housing module for cats being assembled, according to an embodiment.
Figure 7B:
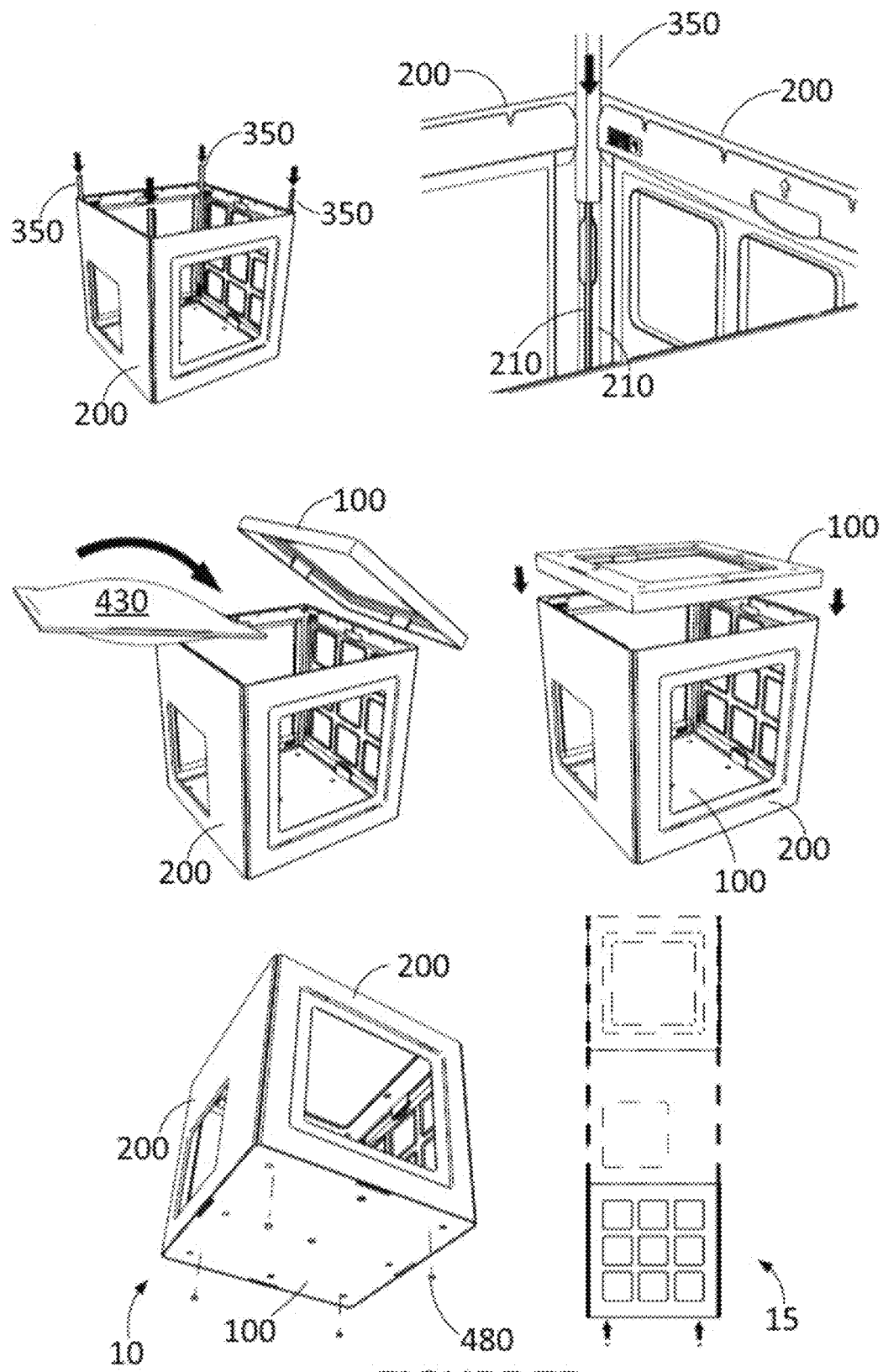

FIGS. 7A-7B illustrate the mounting of kit elements into a module 10. A base 100 is selected (e.g., a base 100a or 100b). A wall panel 200 is then inserted into the base 100, which implies inserting the panel secondary wall 220 into the spacing between the base contour wall 105 and the secondary wall 120 of the base 100, wherein the base-fitting slots 230 cooperate with corresponding ones of the secondary wall inserts 130 of the base 100 in which the wall panel 200 is inserted. The vertical protrusion 140 clips into the opening 240. This step is repeated for all wall panels 200 which may be of different types but all have the same size. Adjacent wall panels 200 form corners between them; these corners extend vertically along the edges of the wall panels 200. Rods 350 can be inserted along these edges to be secured over the union of adjacent rod-mounting edges 210. This insertion and securing of the rods 350 over the union of adjacent rod-mounting edges 210 is illustrated at the fourth step in FIG. 7B.

Other additions can be made, such as fitting an inner cushion 430 inside the module 10, on the base 100 at the bottom of the module 10. Another base 100 can be added over the module 10 as a lid. Non-skid feet 480 can be added under the modules 10, e.g., on the bottom module 10 in the assembly 15.

Figure 8A:
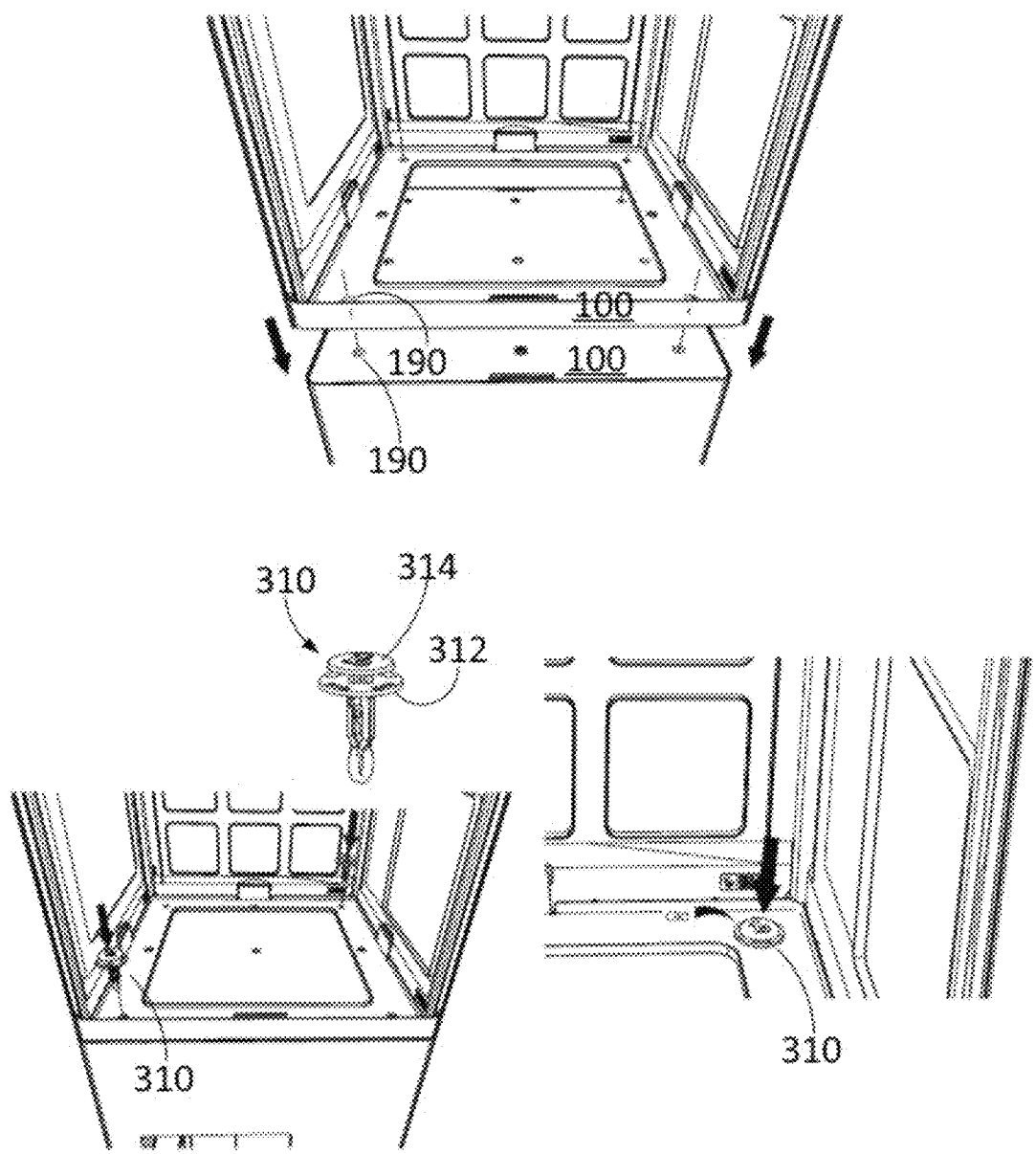
FIGS. 8A-8B are perspective views of a housing module for cats in which accessories are being installed, according to an embodiment.

Modules 10 can be attached together by aligning insertion apertures 190 on the bases 100 (a primary base and a secondary base) of different modules 10 and by inserting the fasteners 310 therethrough, as shown in FIG. 8A. This can be done by making a snap connection between the contacting bodies 101 of these two modules 10 to be assembled together.

According to an embodiment, the fastener 310 comprises two pieces having the general shape of a nail (i.e., disc-shape head extending horizontally with an elongated body longitudinally extending downwardly). These two pieces are allowed to move in relation with each other longitudinally for snapping or unsnapping. In initial state, as provided in the kit, the first nail 312 is the largest one of the pieces and has a hollow head on a hollow body. It further comprises openings on the surface of the body through which material is eventually allowed to extend. The second nail 314 is fitted into the first nail 312 from the top through the hollow head of the first nail 312. Upon inserting the fastener 310 into an aperture 190 as shown in FIG. 8A, the head of the first nail 312 rests on the body 101 of the base 100 on which it lies, while its hollow body extends under the body 101 of the underlying base 100 belonging to the lower module 10. As shown in FIG. 8A, the user may then press on the head of the second nail 314, thereby pushing the body of the second nail 314 deeper into the hollow body of the first nail 312. The body of the second nail 314 is made in an extensible material (i.e., a resilient material) so that this material extends outwardly through the openings on the surface of the first nail 312 when this material is brought deeper under the body 101 of the underlying base 100. The fastener 310 therefore snaps together the contacting bodies 101 of two modules 10.

Figure 8B:
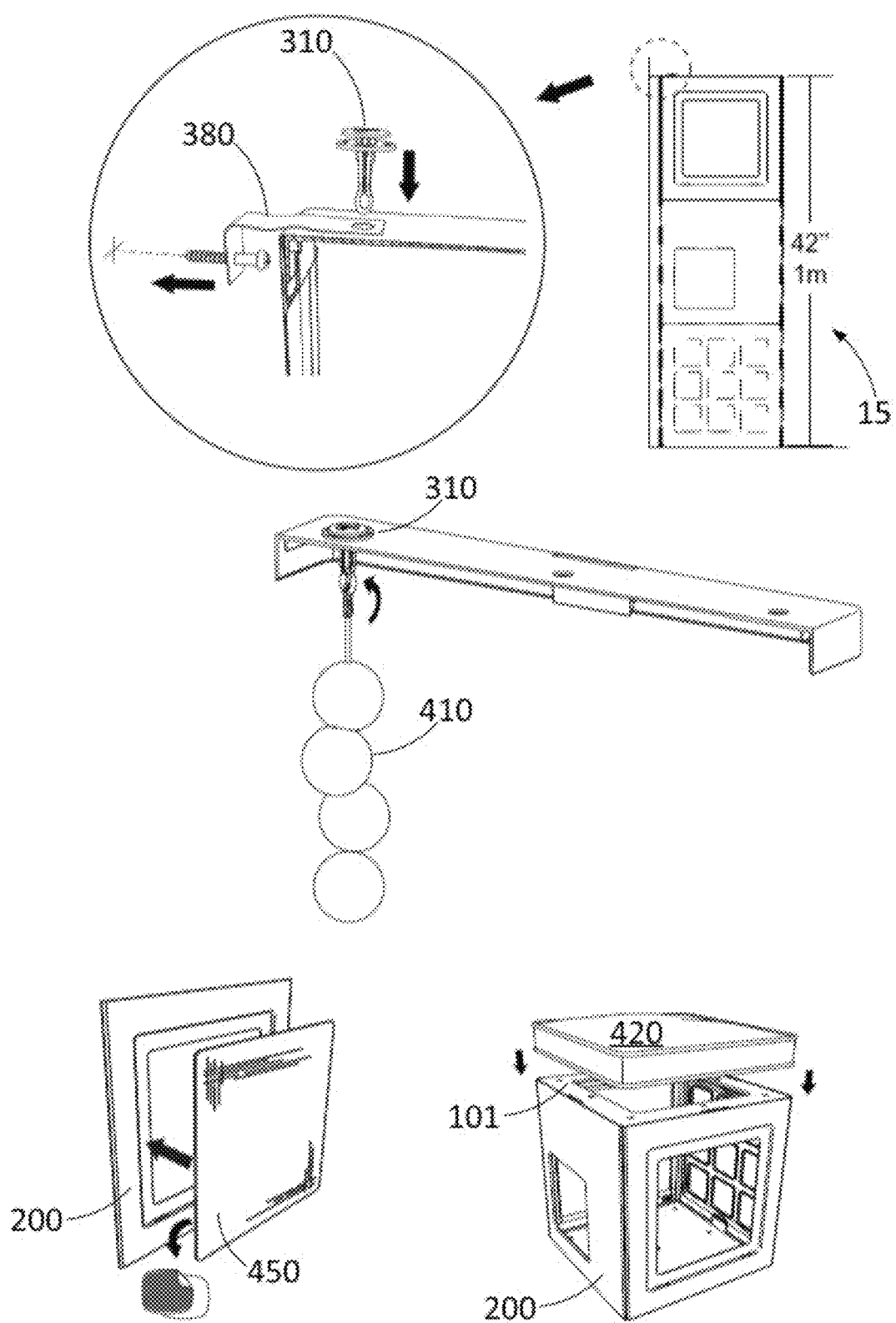

As shown in FIG. 8B, a wall fastener 380 can also be sandwiched by the fastener 310 to be firmly connected to the base 100 of a module 10; the wall fastener 380 is also attached to an adjacent structure such as a wall or heavy furniture for solidity of the assembly 15. Hanging objects 410 can also be hooked on the fasteners 310. The wall fastener 380 can be made of various materials ranging from rigid metal to soft straps, as long as the module 10 can be retained to avoid the collapse of the assembly 15.

A scratching pad 450 can be mounted on a dedicated mounting surface on the mounting wall panel 200d. An outside cushion 420 can be installed on top of an upper base 100, attached on its body 101.

Figure 9A:
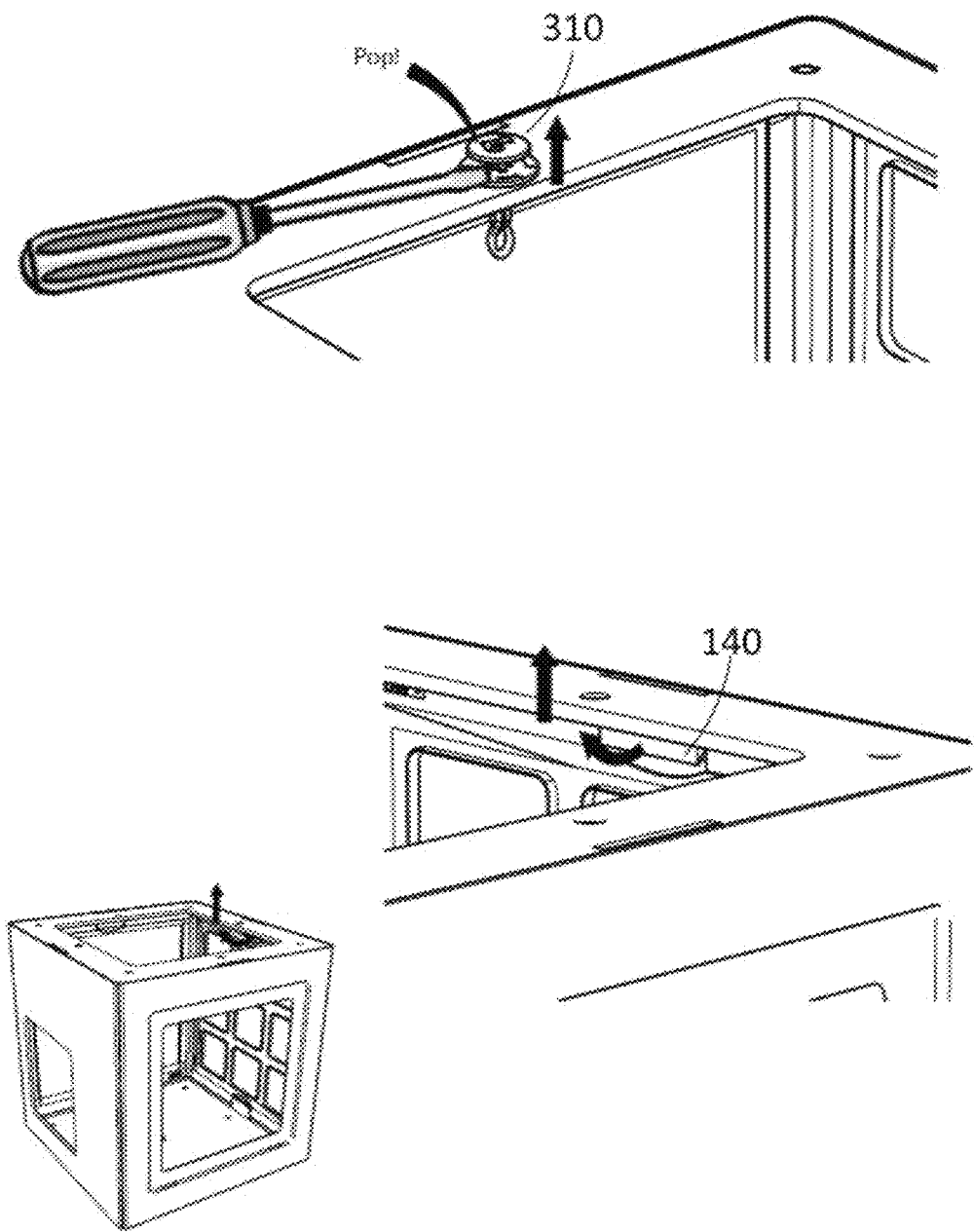
FIGS. 9A-9B are perspective views of a housing module for cats being disassembled, according to an embodiment.
Figure 9B:
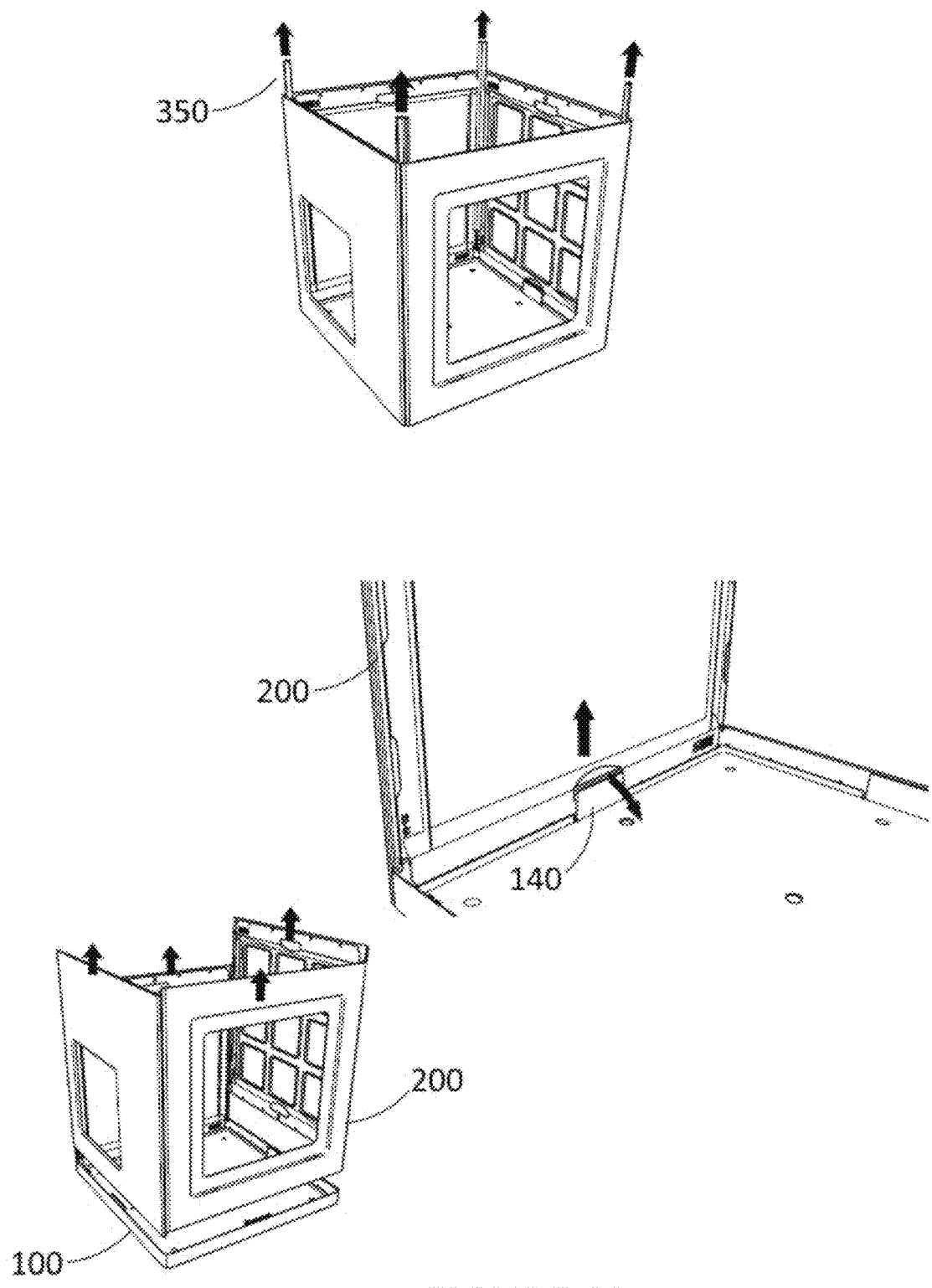

FIGS. 9A-9B illustrate a disassembling of a module 10. The fasteners 310 are first removed. This can be done by pulling up the head of the second nail 314, which cause the resilient extensible material of its body to retract and move up into the first nail 312 which is hollow, thereby unsnapping the contacting bodies 101 of different modules 10.

By pulling the protrusions 145 for unsnapping, the vertical protrusions 140 of the upper base 100 are withdrawn from the opening 240 in which they are fitted to free the upper base 100 from the wall panels 200 on which it rests. Rods 350 which are securing the rod-mounting edges 210 together can be removed by sliding them out of the corners of the wall panels 200. The lower set of vertical protrusions 140 need to be withdrawn from the openings 240 in which they are fitted by pulling on the protrusions 145 of the lower base 100 for unsnapping to free the wall panels 200 resting on the lower base 100 from this base.

It will be appreciated that the kit described above allows the manufacture of wall panels substantially having the same shape, which is more efficient in an industrial setting.

It is further to be appreciated that the kit described above allows the manufacture of at least one of the bases and the wall panels as a single molded piece, which decrease manufacturing costs, increase replicability and increase strength of the pieces.

The use of similarly shaped wall panels 200 and bases 100 allows for a simpler packaging. Kits do not need to be pre-mounted; they may be stored instead of being mounted and displayed in store. Moreover, the wall panels 200 and bases 100 are interchangeable, thereby rendering customizable the modules 10 in an assembly 15, i.e., each specific type of wall panel 200 can be installed at a specific location in the assembly that better suits the need of the cat or cat owner instead of installing these walls at predetermined locations.

The use of rods 350 that secure adjacent edges of wall panels 200 prevents adjacent edges of adjacent wall panels 200 to space apart when pressure is applied from the top or from the inside of the module 10.

The fasteners 310 ensure fast and easy assembling from the user point of view since they involve snapping and unsnapping and therefore do not require any screws or specialized tools. Disassembling modules 10 in an assembly 15 is also facilitated since no unscrewing is required.

The snap connection of the wall panels 200 with bases 100 also ensure fast and easy assembling from the user point of view since they involve snapping and unsnapping and therefore do not require any screws or specialized tools.

As a general note, directions such as "vertical" or "horizontal" are used for the purpose of intelligibility to describe orientation of parts. It will be understood that these terms refer to the perpendicularity of parts between them and to the usual orientation in which they are expected to be used. However, the modules 10 could be turned in other directions, which implies that the base 100 does not have to be horizontal and the wall panels 200 do not have to be vertical if the module 10 is turned aside, lying on one of its wall panels 200, or if the module 10 is for some reason installed on a slope.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A kit for building a module for a pet, the kit comprising:
two bases, each base comprising a base body extending along a first plane, a base contour wall extending substantially perpendicularly to the first plane along a contour of the base body and a base secondary wall extending substantially parallel to the base contour wall thereby defining an anchoring space between the base contour wall and the base secondary wall; and
wall panels, each wall panel comprising a panel body and a panel secondary wall substantially parallel to the panel body, wherein the panel secondary wall is for insertion into the anchoring space to thereby releasably hold the panel secondary wall into the anchoring space,
wherein each base further comprises a protrusion biased toward the anchoring space and each wall panel comprises an abutting surface, wherein the protrusion releasably locks the wall panel in place by cooperating with the abutting surface upon insertion of any one of the wall panels in the anchoring space.

2. The kit of claim 1, wherein the panel secondary wall comprises an opening and wherein the opening provides the abutting surface.

3. The kit of claim 1, wherein the base secondary wall has a height relative to the first plane and wherein the protrusion extends perpendicular to the first plane above the height of the base secondary wall.

4. The kit of claim 1, wherein each base further comprises inserts joining the base contour wall and the base secondary wall, and each wall panel comprise slots, wherein the inserts enter in the slots upon inserting each wall panel in the anchoring space.

5. The kit of claim 1, wherein each wall panel comprises edges, the kit further comprising rods having a shape that is complementary to the edges, wherein the rods are for cooperating with the edges of adjacent wall panels thereby joining the adjacent wall panels.

6. The kit of claim 1, wherein each base further comprises an aperture and the kit further comprises a fastener, wherein two contacting modules are joined together by passing the fastener through the apertures of the two contacting modules.

7. The kit of claim 1, wherein the base contour wall extends perpendicularly to the first plane above the base secondary wall.

8. The kit of claim 1, wherein each base and each wall panel is made of a single molded piece.

9. The kit of claim 1, wherein the wall panels are interchangeable with each other, thereby allowing customization of the module.

10. A kit for building a module for a pet, the kit comprising:
two bases, each base comprising:
a base body extending along a first plane;
a base contour wall extending substantially perpendicularly to the first plane along a perimeter of the base body;
a base secondary wall extending substantially parallel to the base contour wall thereby defining an anchoring space between the base contour wall and the base secondary wall; and
a protrusion biased toward the anchoring space; and
at least three wall panels, each wall panel comprising:
a panel body and an abutting surface; and
a panel secondary wall substantially parallel to the panel body;
wherein the panel secondary wall is for insertion into the anchoring space, and wherein, upon insertion, the protrusion releasably locks the wall panel in place by cooperating with the abutting surface of the inserted panel secondary wall.

11. The kit of claim 10, wherein each wall panel further comprises an opening providing the abutting surface.

12. The kit of claim 10, wherein each base further comprises inserts joining the base contour wall and the base secondary wall, and each wall panel comprise slots, wherein the inserts enter in the slots upon inserting of each wall panel in the anchoring space.

13. The kit of claim 10, wherein each wall panel comprises edges, the kit further comprising rods having a shape that is complementary to the edges, wherein the rods are for cooperating with the edges of adjacent wall panels thereby joining the adjacent wall panels.

14. The kit of claim 10, wherein each base further comprises an aperture and the kit further comprises a fastener, wherein two contacting modules are joined together by passing the fastener through the apertures of the two contacting modules.

15. The kit of claim 10, wherein the base secondary wall has a height relative to the first plane and wherein the protrusion extends perpendicularly to the first plane above the height of the base secondary wall.

16. The kit of claim 10, wherein each base and each wall panel is made of a single molded piece.

17. A method for building a module for a pet, the method comprising the steps of:
providing two bases and at least three wall panels, a first one of the two bases and the wall panels comprising a female anchoring component and a second one of the two bases and the wall panels comprising a male anchoring component complementary to the female anchoring component, the first one of the two bases further comprising a protrusion biased toward the female anchoring component and the second one of the two bases further comprising a protrusion biased toward the male anchoring component, and each one of the at least three wall panels comprises an abutting surface;

mounting the at least three wall panels to the first one of the bases by, for each one of the wall panels, inserting the male anchoring component in the female anchoring component thereby defining a junction therebetween, wherein the protrusion of the first one of the two bases releasably locks said each one of the wall panels in place by cooperating with the abutting surface upon inserting the male anchoring component in the female anchoring component; and mounting the second one of the bases to the wall panels by inserting, for each one of the wall panels, the male anchoring component in the female anchoring component thereby defining a junction therebetween, wherein the protrusion of the second one of the two bases releasably locks said each one of the wall panels in place by cooperating with the abutting surface upon inserting the male anchoring component in the female anchoring component.

18. The method of claim 17, wherein the wall panels comprise a contour comprising two anchoring components and edges,
the method further comprising:
providing a rod having a complementary shape to the edges of two adjacently mounted wall panels; and
clamping the rod to the edges of the two adjacently mounted wall panels.

19. The method of claim 17, wherein the built module is a primary module,
the method further comprising:
building an additional module for a pet;
selecting a primary contact base among the two bases of the primary module and a secondary contact base among the two bases of the additional module;
placing the primary contacting base in contact with a secondary contacting base with an aperture in the primary contacting base aligned with an aperture in the secondary contacting base; and
inserting a fastener through the apertures thereby fastening the primary module to the additional module.

\* \* \* \* \*